(12) United States Patent
Lee et al.

(10) Patent No.: US 12,454,784 B2
(45) Date of Patent: Oct. 28, 2025

(54) WASHING MACHINE (71) Applicant: Samsung Electronics Co., Ltd., Suwon-si (KR)

(72) Inventors: Kyunam Lee, Suwon-si (KR); Heejin Kang, Suwon-si (KR); Youngjin Um, Suwon-si (KR); Jungwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 18/332,604

(22) Filed: Jun. 9, 2023

(65) Prior Publication Data

US 2023/0313434 A1 Oct. 5, 2023

Related U.S. Application Data (63) Continuation of application No. PCT/KR2022/001460, filed on Jan. 27, 2022.

(30) Foreign Application Priority Data

Feb. 10, 2021 (KR) .................. 10-2021-0019038
May 28, 2021 (KR) .................. 10-2021-0068908

(51) Int. Cl.
*B01F 27/192* (2022.01)
*B01F 27/112* (2022.01)
(Continued)

(52) U.S. Cl.
CPC ............ *D06F 37/14* (2013.01); *B01F 27/112* (2022.01); *B01F 27/114* (2022.01);
(Continued)

(58) Field of Classification Search
None
See application file for complete search history.

(56) References Cited

U.S. PATENT DOCUMENTS 5,611,221 A    3/1997  Tremel
6,742,934 B2   6/2004  Matsuyama et al.
(Continued)

FOREIGN PATENT DOCUMENTS

CN    110857500 A    3/2020
JP      3608611 B2    1/2005
(Continued)

OTHER PUBLICATIONS

KR 20000009797 A machine translation, Pulsator for Washing Machine, Jung (Year: 2000).*

(Continued)

*Primary Examiner* — Cristi J Tate-Sims (57) ABSTRACT

Disclosed is a washing machine with an improved stirring device. The washing machine includes a tub, a rotating tub rotatably provided in the tub, a stirring device including a first stirring portion rotatably provided below the rotating tub, and a second stirring portion coupled to the first stirring portion. The second stirring portion includes a cylindrical wash rod body and a groove that is recessed from an outer surface of the wash rod body and extends in a longitudinal direction to accommodate a parting line formed by a manufacturing process.

20 Claims, 11 Drawing Sheets (51) Int. Cl.
| | |
|---|---|
| *B01F 27/114* | (2022.01) |
| *B01F 27/808* | (2022.01) |
| *B01F 27/90* | (2022.01) |
| *B01F 27/921* | (2022.01) |
| *D06F 23/04* | (2006.01) |
| *D06F 37/14* | (2006.01) |
| *B01F 101/00* | (2022.01) |

(52) U.S. Cl.
CPC ........ *B01F 27/1921* (2022.01); *B01F 27/808* (2022.01); *B01F 27/90* (2022.01); *B01F 27/9214* (2022.01); *D06F 23/04* (2013.01); *B01F 2101/4505* (2022.01)

(56) References Cited

U.S. PATENT DOCUMENTS

| | | |
|---|---|---|
| 6,886,372 B2 | 5/2005 | Kropf |
| 7,069,752 B2 | 7/2006 | Clark et al. |
| 7,757,522 B2 | 7/2010 | Pinkowski et al. |
| 8,833,111 B2 | 9/2014 | Dominguez et al. |
| 10,787,761 B2 | 9/2020 | Czarnecki et al. |
| 11,365,505 B2 | 6/2022 | Liu et al. |
| 2005/0284196 A1 | 12/2005 | Kopyrin et al. |
| 2005/0284197 A1* | 12/2005 | Pinkowski .............. D06F 13/02 68/133 |
| 2016/0362826 A1 | 12/2016 | Obregon et al. |
| 2019/0062978 A1* | 2/2019 | Czarnecki ............... D06F 31/00 |
| 2020/0370229 A1 | 11/2020 | Bensel et al. |

FOREIGN PATENT DOCUMENTS

| | | |
|---|---|---|
| JP | 4017607 B2 | 12/2007 |
| KR | 10-0173142 B1 | 5/1999 |
| KR | 10-2000-0009797 A | 2/2000 |
| KR | 10-2005-0050269 A | 5/2005 |
| KR | 10-1428485 B1 | 8/2014 |

OTHER PUBLICATIONS

International Search Report and Written Opinion of the International Searching Authority dated May 6, 2022, in connection with International Application No. PCT/KR2022/001460, 9 pages.

* cited by examiner

WASHING MACHINE

This application is a Bypass Continuation of International Application No. PCT/KR2022/001460, filed Jan. 27, 2022, which claims priority to Korea Patent Application No. 10-2021-0019038, filed Feb. 10, 2021, and Korea Patent Application No. 10-2021-0068908, filed May 28, 2021, the disclosures of which are herein incorporated by reference in their entirety.

BACKGROUND

1. Field

The present disclosure relates to a washing machine, and more particularly, to a washing machine with an improved stirring device.

2. Description of Related Art

A washing machine is a device that uses the driving force of a motor to agitate laundry, wash water, and detergent put into a rotating tub so that washing is performed through mutual friction.

In general, in a washing machine, a pulsator-type washing machine performs washing by rotating wash water and laundry with a pulsator rotatably installed on the bottom inside the water tank, an agitator-type washing machine performs washing by stirring wash water and laundry with an agitator protruding from the center of a water tank, and a rotary tub washing machine performs washing by repeating an operation of raising and lowering laundry by rotating a rotary tub in which the laundry is placed.

In addition, the washing machine includes a tub for storing water and a rotating tub rotatably installed inside the tub. A pulsator is installed at the bottom of the rotating tub to form a water stream while rotating. The pulsator rotates in a forward and reverse direction to form a water stream, and the wash water and the laundry are stirred and rotated by the water stream formed by the pulsator to wash the laundry.

Recently, research on a structure for improving washing power to add complexity to the flow of laundry has been conducted.

SUMMARY

Therefore, it is an aspect of the disclosure to provide a washing machine with an improved stirring device.

It is another aspect of the disclosure to provide a washing machine capable of minimizing friction with clothes by positioning a parting line in a recess formed on an outer surface of a stirring device.

It is another aspect of the disclosure to provide a washing machine with an improved coupling structure of a stirring device.

It is another aspect of the disclosure to provide a washing machine provided with a sealing member to absorb shock of a stirring device.

In accordance with an aspect of the disclosure, a washing machine comprising a tub, a rotating tub rotatably provided in the tub, a stirring device including a first stirring portion rotatably provided in a lower portion of the rotating tub and a second stirring portion coupled to the first stirring portion, and the second stirring portion includes a washing rod body having a cylindrical shape, and a groove recessed from an outer surface of the washing rod body and extending in a longitudinal direction to accommodate a parting line formed by a manufacturing process.

The groove is formed to be recessed from the outer surface of the washing rod body.

The groove is formed to be concave 0.3 mm inward from the outer surface of the washing rod body.

A width of the groove is formed to be 1.0 mm or less.

The stirring device includes a coupling portion configured to detachably connect the first stirring portion and the second stirring portion, wherein the coupling portion includes a first coupling portion provided in the first stirring portion, and a second coupling portion provided in the second stirring portion to correspond to the first coupling portion.

The stirring device includes a sealing member configured to absorb an impact between the first stirring portion and the second stirring portion.

The sealing member is mounted on the second stirring portion.

The first coupling portion includes a coupling groove formed to be recessed on an upper surface of the first stirring portion, and a plurality of rotation preventing grooves formed to be recessed downward from the coupling groove.

The second coupling portion includes a coupling protrusion formed at a lower part of the second stirring portion to correspond to the coupling groove, and a plurality of rotation preventing protrusions protruding downward from the coupling protrusion and corresponding to the plurality of rotation preventing grooves.

The rotation preventing protrusion further includes a guide formed to be inclined to guide coupling to the coupling groove.

The coupling portion further includes a reinforcing rib configured to reinforce strength between the first stirring portion and the second stirring portion, and wherein the reinforcing rib is formed on at least one of the first coupling portion or the second coupling portion.

The coupling portion further includes a support portion configured to support the coupling of the first coupling portion and the second coupling portion, and wherein the support portion includes a first support portion formed around an upper end of the coupling groove, and a second support portion extending on an outer circumferential surface of the coupling portion to correspond to the first support portion.

The sealing member is provided between the first support portion and the second support portion.

The second stirring portion further includes a cap detachably mounted to the washing rod body, wherein the cap extends to be detachably mounted to the washing rod body and further includes a hook capable of being elastically supported, wherein a hook hole is formed on the washing rod body to lock and unlock the hook.

In accordance with another aspect of the disclosure, a washing machine comprises a rotating tub configured to accommodate laundry, a pulsator rotatably provided under the rotating tub, and an agitator perpendicularly coupled to the pulsator and configured to rub the laundry and the water, wherein the agitator includes a cylindrical shaped agitator body and a spiral shape agitator blade extending from an outer circumferential surface of the agitator body, and a groove formed to be recessed on an outer circumferential surface of the agitator body and extending in a longitudinal direction, and a parting line formed during a manufacturing process of the agitator is accommodated in the groove.

The groove is formed to be concave 0.3 mm inward from the outer surface of the agitator body, and has a width of 1.0 mm or less.

The pulsator includes a first coupling portion and the agitator includes a second coupling portion configured to detachably connect to the first coupling portion.

The washing machine further includes a sealing member configured not to absorb impact between the pulsator and the agitator.

The first coupling portion includes a first support portion formed around an upper end of the first coupling portion, and the second coupling portion includes a second support portion extending from an outer circumferential surface of the second coupling portion to correspond to the first support portion.

The sealing member is provided between the first support portion and the second support portion.

The stirring device of the present invention minimizes frictional force with laundry by means of a parting line recessed on the outer surface, thereby minimizing damage to fabric during washing, and reduces post-processing, thereby having an efficient effect in manufacturing and managing mold.

It is possible to cover the parting line and burr formed by the manufacturing process by being accommodated on the groove formed by recessing from the outer surface of the stirring device, and to reduce direct contact with the laundry, thereby reducing form wear.

There is an effect of improving the binding force and durability for rotation by improving the coupling structure of the stirring device.

There is an effect of absorbing shock and preventing breakage and deformation by adding a sealing member to the stirring device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "left", "right", and the like may be defined by the drawings, but the shape and the location of the component is not limited by the term.

Figure 1:
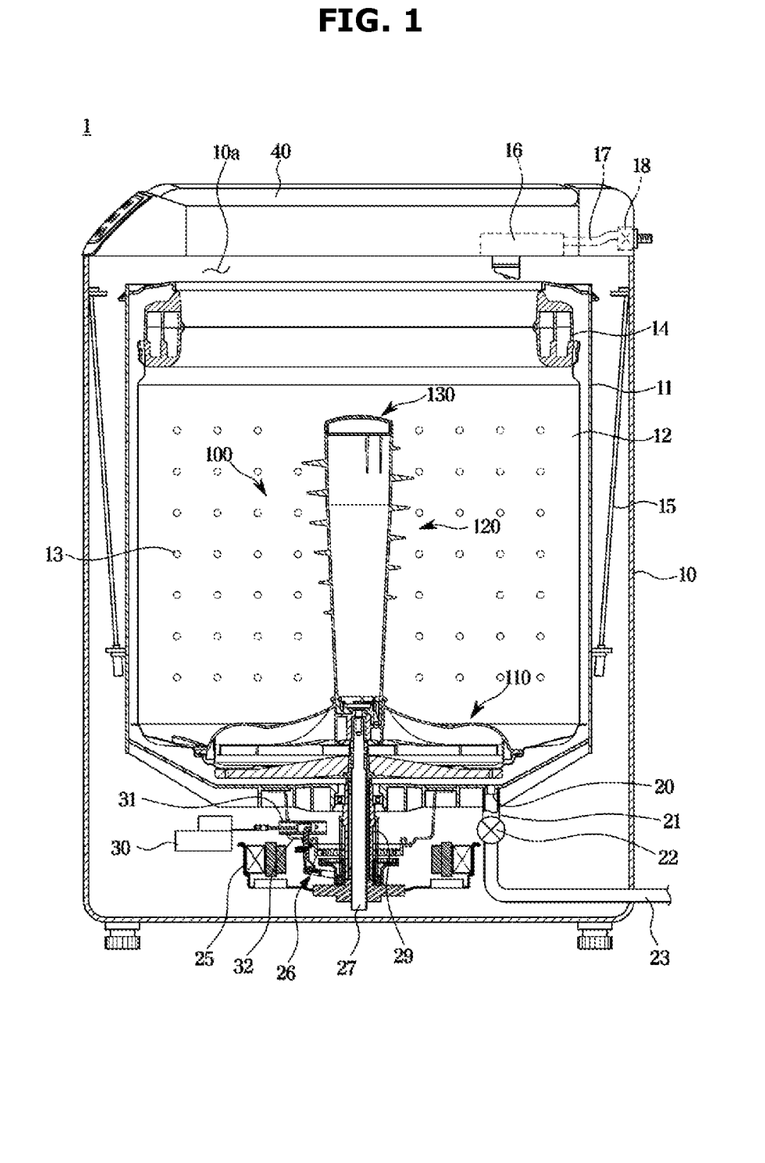
FIG. 1 is a cross-sectional view of a washing machine according to an embodiment of the present invention.
Figure 2:
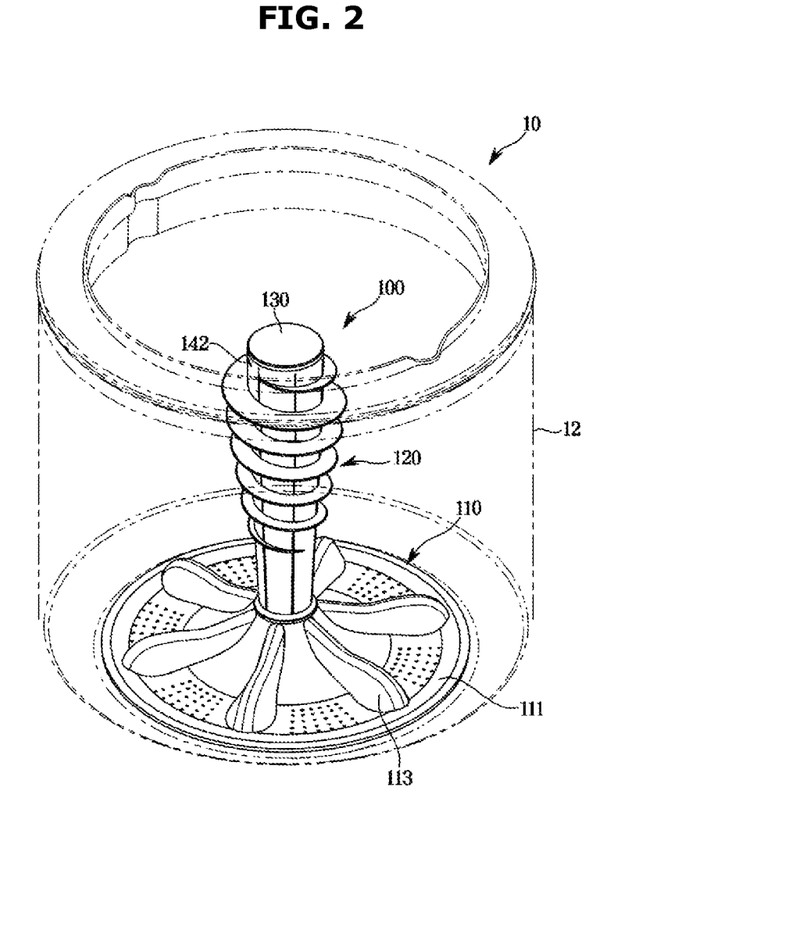
FIG. 2 is a perspective view showing the internal structure of a washing machine according to an embodiment of the present invention.

FIG. 1 is a cross-sectional view of a washing machine according to an embodiment of the present invention, and FIG. 2 is a perspective view showing the internal structure of a washing machine according to an embodiment of the present invention.

As shown in FIGS. 1 and 2, the washing machine 1 includes a cabinet 10 forming an exterior, a tub 11 disposed inside the cabinet 10 to store wash water, and a rotating tub 12 rotatably disposed inside the tub 11, and a stirring device 100 disposed inside the rotating tub 12 to generate water flow.

The cabinet 10 forms the exterior of the washing machine 1 and is formed in a substantially rectangular parallelepiped shape. An input port 10a is formed at an upper portion of the cabinet 10 to input laundry into the rotating tub 12. A door capable of opening and closing the input port 10a may be provided on the upper surface of the cabinet 10. The input port 10a may be opened and closed by a door 40 installed on the top of the cabinet 10.

The tub 11 is vertically installed inside the cabinet 10. The tub 11 is formed in a substantially hollow cylindrical shape with a bottom so as to accommodate a certain amount of wash water. The tub 11 may be supported on the cabinet 10 by a suspension device 15. Vibrations generated in the tub 11 may be damped by the suspension device 15.

A water supply pipe 17 for supplying wash water to the tub 11 is installed above the tub 11. One side of the water supply pipe 17 is connected to an external water supply source, and the other side of the water supply pipe 17 is connected to the detergent supply device 16. Water supplied through the water supply pipe 17 is supplied to the inside of the tub 11 together with detergent via the detergent supply device 16. A water supply valve 18 is installed in the water supply pipe 17 to control the supply of water.

The rotating tub 12 is formed in a substantially hollow cylindrical shape with a bottom, and is rotatably installed inside the tub 11. The rotating tub 12 is provided in a cylindrical shape with an open top, and a plurality of dewatering holes 13 are formed on the side thereof. A balancer 14 may be mounted on an upper portion of the rotating tub 12 so that the rotating tub 12 can stably rotate at high speed.

On the outside of the lower side of the tub 11, a motor 25 for generating driving force to rotate the rotating tub 12 and the stirring device 100, and a power converter 26 that transmits the driving force generated from the motor 25 simultaneously or selectively.

A hollow type of dehydration shaft 29 is coupled to the rotating tub 12, and the washing shaft 27 installed in the hollow of the dehydration shaft 29 is coupled to the stirring device 100 through the washing shaft coupling portion 28. The motor 25 may simultaneously or selectively transmit driving force to the rotating tub 12 and the stirring device 100 according to the operation of the power converter 26.

The power converter 26 is configured to include an actuator 30 that generates a driving force for power conversion, a rod portion 31 that moves linearly according to the operation of the actuator 30, and a clutch portion 32 that is connected to the rod portion 31 and rotates according to the operation of the rod portion 31.

A drain hole 20 is formed at the bottom of the tub 11 to discharge wash water stored in the tub 11, and a first drainpipe 21 is connected to the drain hole 20. A drain valve 22 may be installed in the first drainpipe 21 to control drain. An outlet of the drain valve 22 may be connected to a second drainpipe 23 for discharging wash water to the outside.

The rotating tub 12 may be rotatably provided inside the tub 11. The rotating tub 12 may be formed in a substantially cylindrical shape with an open upper surface. The rotating tub 12 may be disposed such that its central axis coincides with the central axis of the tub 11.

The washing machine 1 may further include a stirring device 100 for stirring laundry and wash water. The stirring device 100 may be installed in the rotating tub 12. The stirring device 100 may be provided to generate a water flow while rotating forward and backward in the rotating tub 12. Laundry accommodated in the rotating tub 12 is agitated with wash water by the water flow generated by the stirring device 100 and can be washed by friction.

Figure 3:
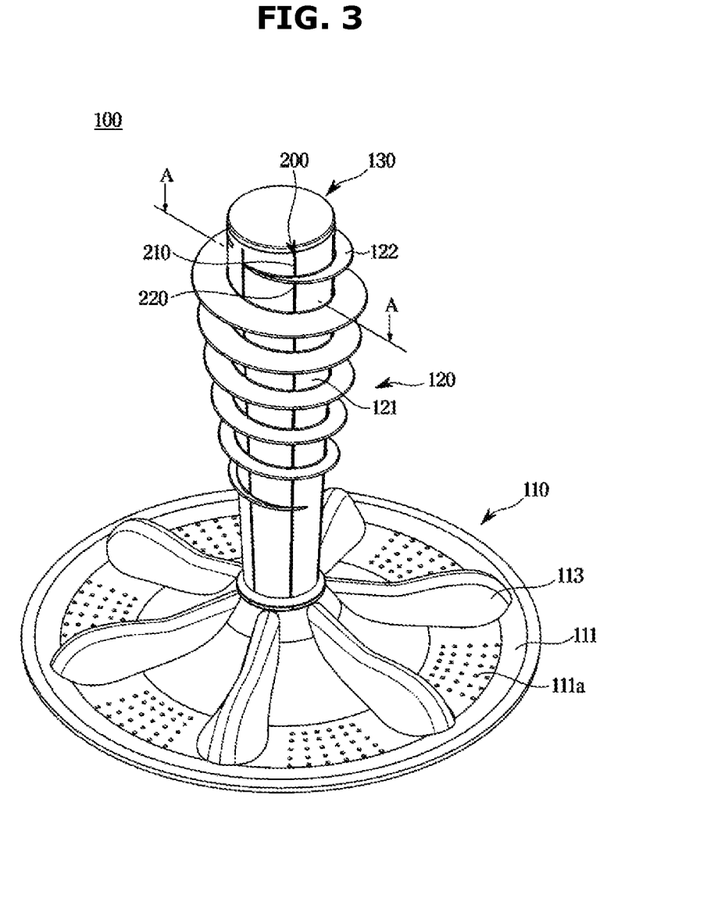
FIG. 3 is a perspective view showing a stirring device according to an embodiment of the present invention.
Figure 4:
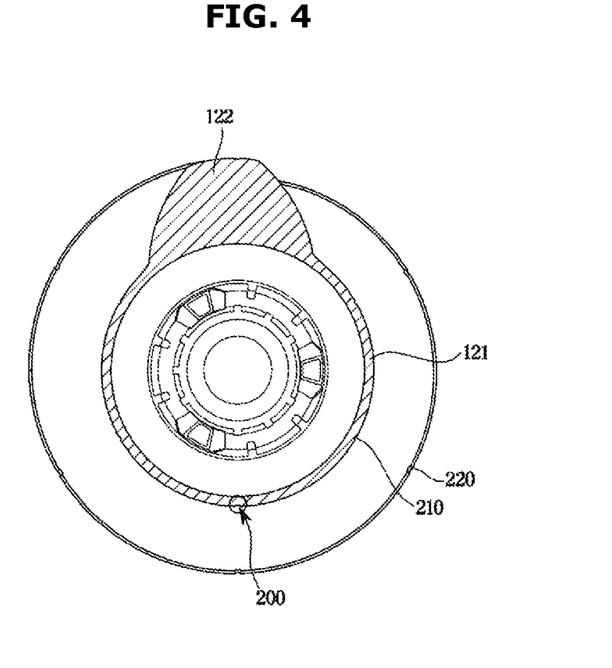
FIG. 4 is a cross-sectional view of part A-A' of FIG. 3, showing a second stirring portion of the stirring device according to an embodiment of the present invention.
Figure 5:
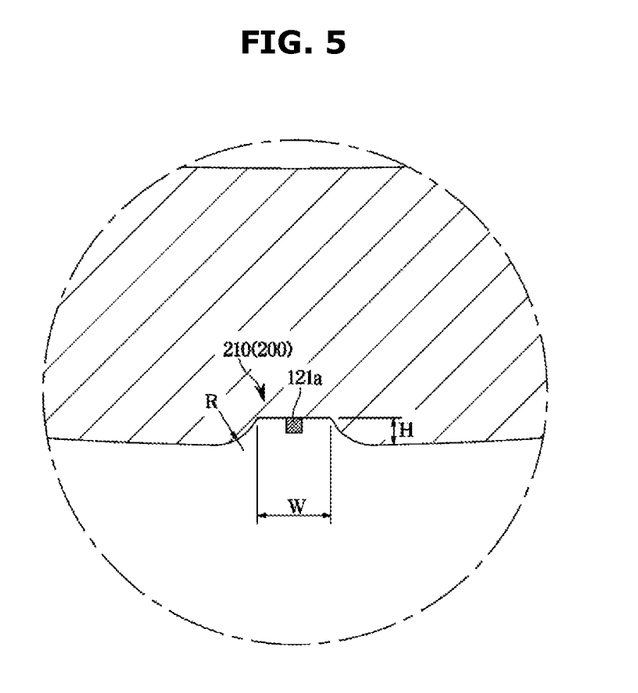
FIG. 5 is an enlarged view of FIG. 4, showing a parting line formed in a groove of a second stirring portion according to an embodiment of the present invention.

FIG. 3 is a perspective view showing a stirring device according to an embodiment of the present invention, FIG. 4 is a cross-sectional view of part A-A' of FIG. 3, showing a second stirring portion of the stirring device according to an embodiment of the present invention, and FIG. 5 is an enlarged view of FIG. 4, showing a parting line formed in a groove of a second stirring portion according to an embodiment of the present invention.

As shown in FIG. 3 to FIG. 5, the stirring device 100 is configured to generate water flow by rotating forward and backward in the rotating tub 12.

The stirring device 100 may include a first stirring portion 110 and a second stirring portion 120 extending upward from the first stirring portion 110. The first stirring portion 110 of the stirring device 100 is rotatably provided on the inner bottom of the rotating tub 12 and can be referred to as a base or a pulsator, and the second stirring portion 120 extends upward from the bottom of rotating tub 12 and can be referred a tower, a washing rod, or an agitator.

The first stirring portion 110 of the stirring device 100 is rotatably provided at the bottom of the rotating tub 12 to generate water flow. The first stirring portion 110 may be rotatably provided on the inner bottom of the rotating tub 12.

The first stirring portion 110 may include a first body 111 and a first blade 113 protruding from an upper surface of the first body 111. The first body 111 may be referred to as a pulsator body.

The first body 111 of the first stirring portion 110 may be rotatably installed on the lower surface of the rotating tub 12. The first body 111 may be formed in a substantially disc shape. The first body 111 may include at least one first blade 113 protruding upward. The first blade 113 is formed in a plurality. The plurality of first blades 113 may be formed in the same shape. A plurality of first blades 113 may be arranged at regular intervals in the circumferential direction. As a non-limiting example, six first blades 113 can be spaced apart at regular intervals. However, the shape and number of the first blades 113 may vary. The first blade 113 is provided to generate water flow inside the rotating tub 12. The first blade 113 may be referred to as a pulsator blade.

A plurality of holes 111a may be formed in the first body 111 of the first stirring portion 110. The plurality of holes 111a may be formed at positions spaced apart from the first blade 113.

A coupling portion 300 for coupling the second stirring portion 120 may be provided at the center of the upper surface of the first body 111. The coupling portion 300 of the first stirring portion 110 and the second stirring portion 120 of the stirring device 100 will be described in detail below.

The second stirring portion 120 may include a second body 121 formed in a substantially cylindrical shape and a second blade 122 protruding from an outer circumferential surface of the second body 121. The second body 121 may be referred to as an agitator body, a tower body, or a washing rod body. The second blade 122 may be referred to as an agitator blade, a tower blade, or a washing rod blade.

The second stirring portion 120 is coupled to the first stirring portion 110 and may be rotatably provided within the rotating tub 12. The second stirring portion 120 rubs laundry and wash water inside the rotating tub 12 to perform washing.

The second stirring portion 120 may be installed vertically from the center of the first stirring portion 110. The second stirring portion 120 may include a second blade 122 protruding around the outer circumferential surface of the second body 121 to improve friction of laundry.

The second blade 122 may be formed in a spiral shape on the outer circumferential surface of the second body 121. The second stirring portion 120 may include a second blade 122 integrally injection-molded with the cylindrical second body 121. The second blade 122 may include a spiral rib formed around the outer circumferential surface of the second body 121.

The second stirring portion 120 may include at least one groove 200 formed in the longitudinal direction on the outer circumferential surface of the second body 121. The second stirring portion 120 may include a groove 200 recessed from the outer surface of the second stirring portion 120 in the vertical direction. At least one groove 200 may be formed in a plurality. The second body 121 of the second stirring portion 120 may include a groove 200 recessed in the vertical direction. The second blade 122 of the second stirring portion 120 may include a groove 200 recessed in the vertical direction. The second body 121 and the second blade 122 of the second stirring portion 120 may further include grooves 200 formed in a vertical direction.

The groove 200 of the second stirring portion 120 is formed concave 0.3 mm inward from the outer surface of the second body 121. The groove 200 may have a height H of 0.3 mm or less. The groove 200 may have a width W of 1.0 mm or less.

The groove 200 of the second stirring portion 120 may include a curvature R formed between the groove 200 and the outer surface of the second body 121. The curvature R formed in the groove 200 is provided to reduce friction with laundry.

The groove 200 of the second stirring portion 120 may include a first groove 210 formed in the second body 121 and a second groove 220 formed in the second blade 122. The first groove 210 and the second groove 220 are formed on the same line.

The second stirring portion 120 uses a split core in a vertical or horizontal direction for injection of the cylindrical second body 121 and the spiral-shaped second blade 122 integrally formed in the second body 121.

Although not shown, when injection molding is performed using a mold, a parting line is formed along a junction between two molds. Accordingly, the second stirring portion 120 manufactured by using the split core in the vertical or horizontal direction includes the parting line 121a. Since the parting line 121a of the second stirring portion 120 is structurally exposed to the outside and directly rubs with laundry, it may affect abrasion of the laundry.

The parting line 121a of the stirring device 100 according to the embodiment of the present invention is formed on the groove 200 to be covered by the groove 200. The parting line 121a of the second stirring portion 120 is positioned in the groove 200 formed in the second stirring portion 120. The parting line 121a of the second stirring portion 120 is formed in the groove 200 formed in the second body 121 and the second blade 122. The parting line 121a of the second agitator 120 may be positioned in the groove 200 formed in the second body 121 and the second blade 122 and covered by the groove 200. Direct friction with laundry can be reduced by the parting line 121a covered by the groove 200 of the second agitator 120 and consequently abrasion of the laundry can be prevented.

Although the groove 200 of the present invention is shown as an example formed in the vertical direction of the stirring device 100, the spirit of the present invention is not limited thereto. For example, when the parting line formed by the mold is formed in the horizontal direction, the groove formed in the stirring device may be formed in the horizontal direction of the stirring device.

Figure 6:
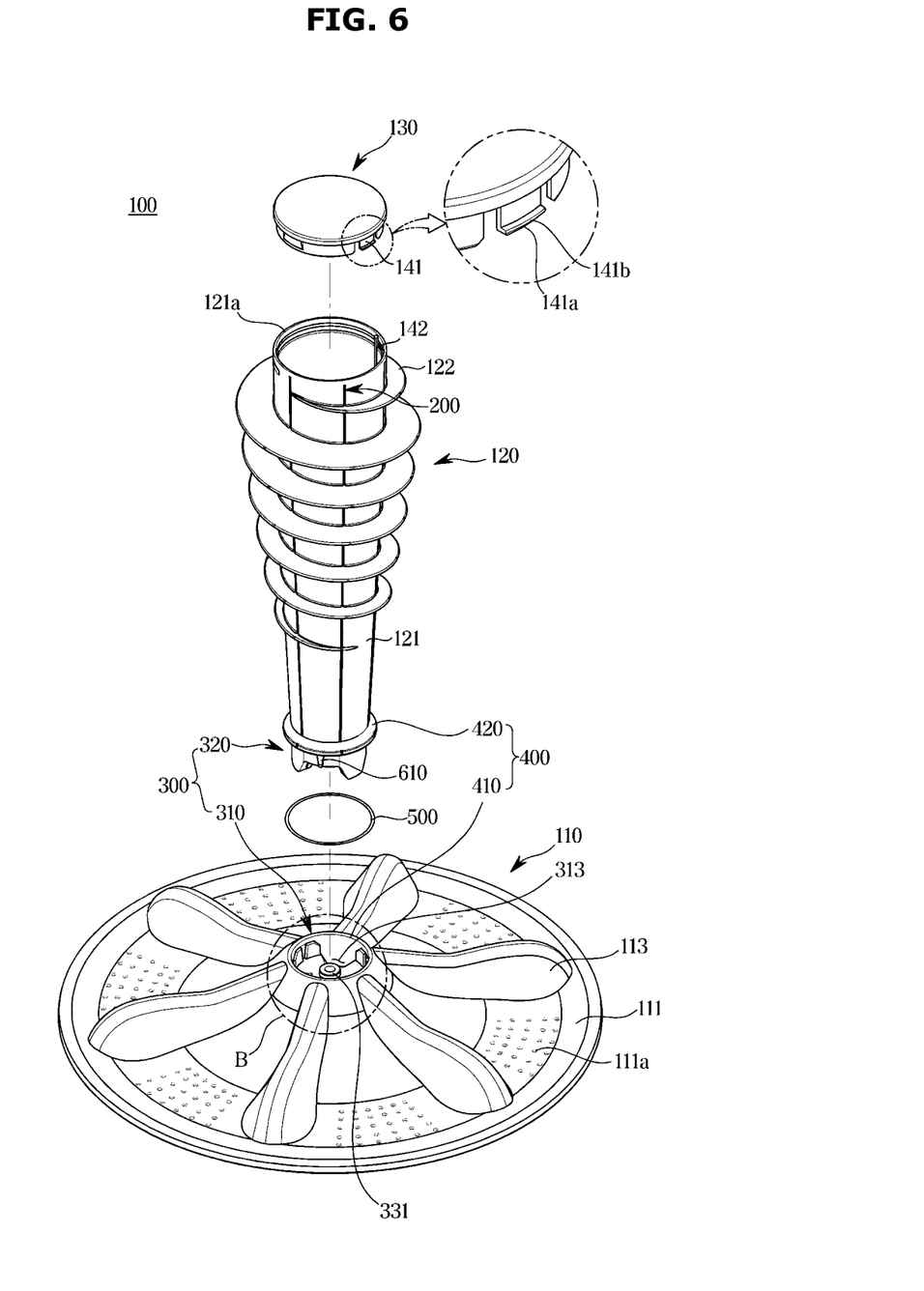
FIGS. 6 to 7 are views showing the first stirring portion and the second stirring portion and the coupling structure of the stirring device according to an embodiment of the present invention.
Figure 7:
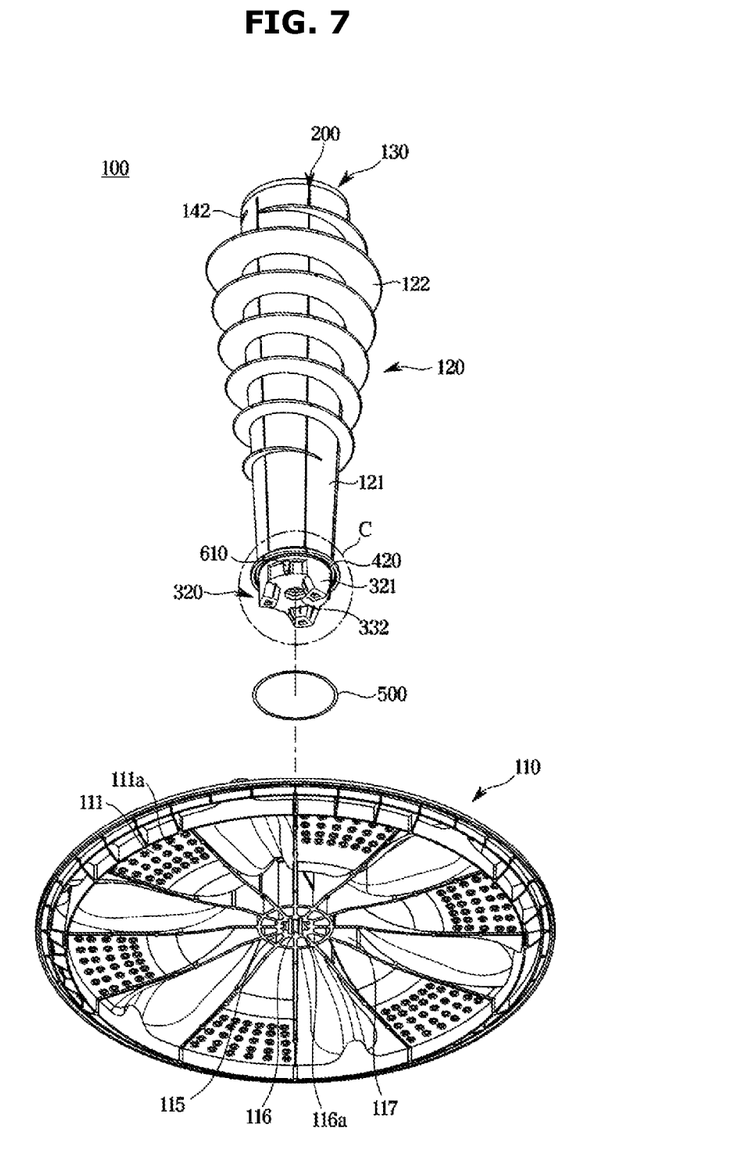
Figure 8:
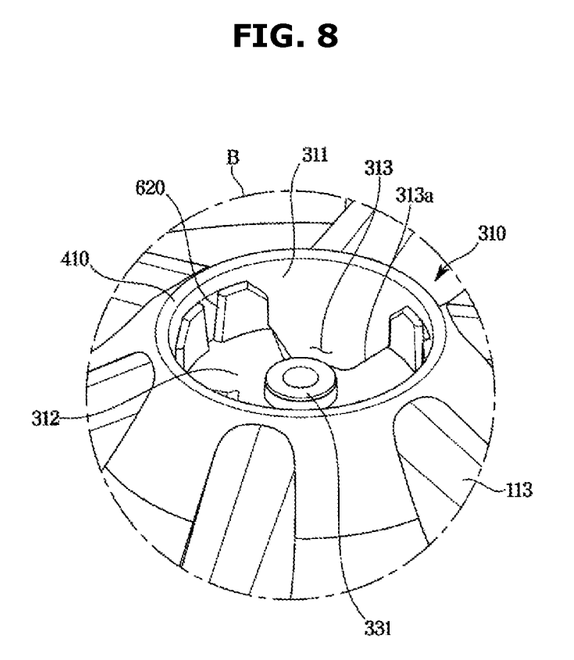
FIG. 8 is an enlarged view of part B of FIG. 6, showing a first coupling portion of the stirring device according to an embodiment of the present invention.
Figure 9:
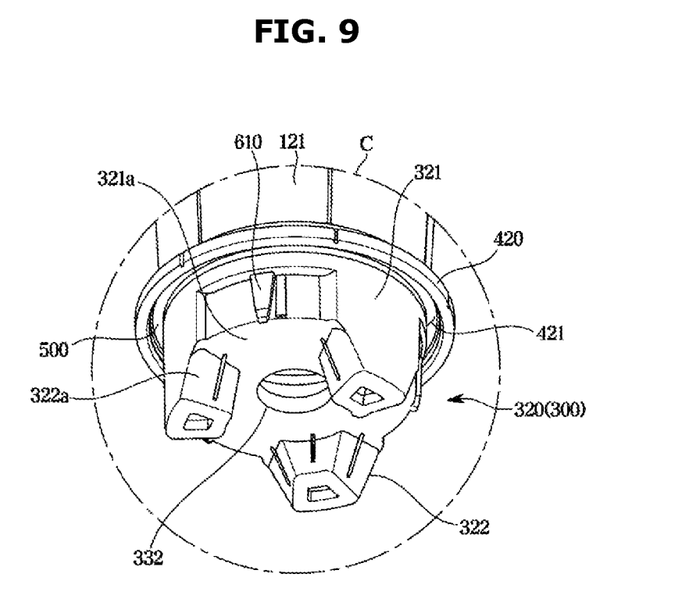
FIG. 9 is an enlarged view of part C of FIG. 7, showing a second coupling portion of the stirring device according to an embodiment of the present invention.
Figure 10:
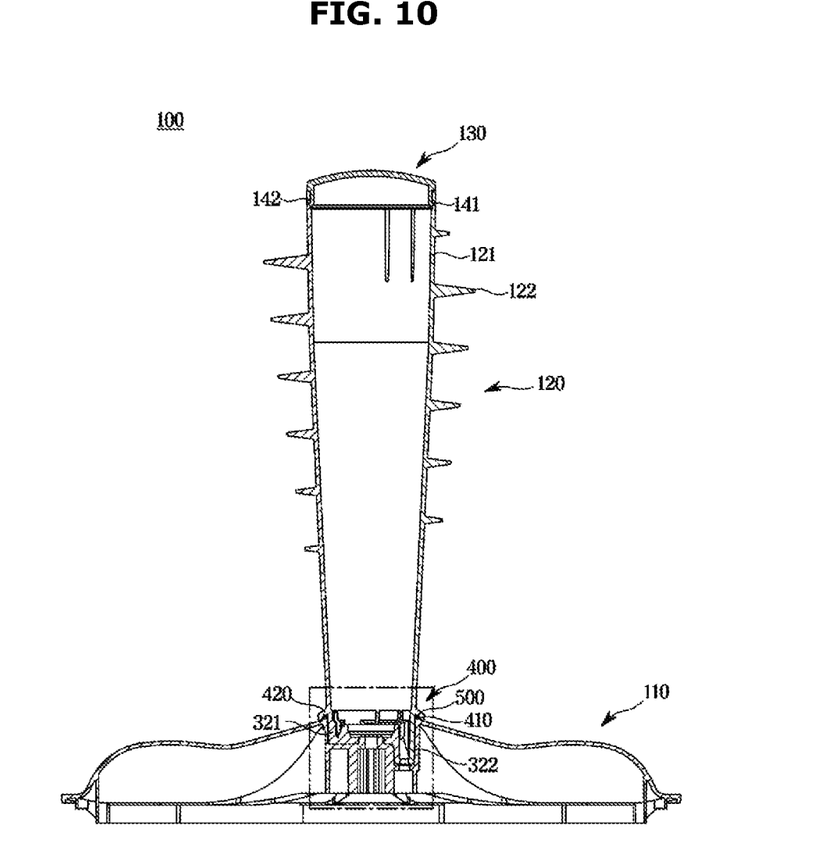
FIG. 10 is a cross-sectional view of a stirring device according to an embodiment of the present invention.
Figure 11:
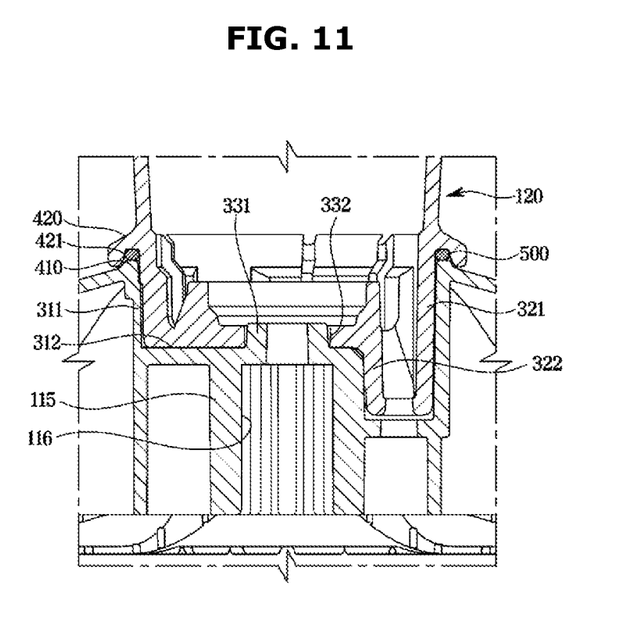
FIG. 11 is an enlarged view of part D of FIG. 10, and is a cross-sectional view showing a coupling portion of a stirring device according to an embodiment of the present invention.

FIGS. 6 to 7 are views showing the first stirring portion and the second stirring portion and their coupling structure of the stirring device according to an embodiment of the present invention, FIG. 8 is an enlarged view of part B of FIG. 6, showing a first coupling portion of the stirring device according to an embodiment of the present invention, FIG. 9 is an enlarged view of part C of FIG. 7, showing a second coupling portion of the stirring device according to an embodiment of the present invention, FIG. 10 is a cross-sectional view of a stirring device according to an embodiment of the present invention, and FIG. 11 is an enlarged view of part D of FIG. 10, and is a cross-sectional view showing a coupling portion of a stirring device according to an embodiment of the present invention.

As shown in FIGS. 6 to 11, the stirring device 100 may include a coupling portion 300 connecting the first stirring portion 110 and the second stirring portion 120.

The coupling portion 300 of the stirring device 100 includes a first coupling portion 310 provided on the first stirring portion 110 and a second coupling portion 320 provided on the second stirring portion 120.

The first coupling portion 310 may be provided at the center of the first stirring portion 110. The second coupling portion 320 may be provided at the lower end of the second stirring portion 120 and may be formed in a shape corresponding to the first coupling portion 310.

The first stirring portion 110 includes a first body 111 having a disk shape and a plurality of first blades 113 provided on the first body 111. The first coupling portion 310 may be provided at the center of the upper surface of the first body 111. The first coupling portion 310 is formed to be recessed in a cylindrical shape at the center of the upper surface of the first body 111.

The second stirring portion includes a second body 121 and a second blade 122 provided on an outer circumferential surface of the second body 121. The second coupling portion 320 may be provided at the lower end of the second body 121. The second coupling portion 320 protrudes from the lower end of the second body 121 and may be provided to be coupled to the first coupling portion 310 recessed in a cylindrical shape at the center of the upper surface of the first body 111.

The second body (hereinafter referred to as 'washing rod body') of the second stirring portion 120 is provided in a hollow cylindrical shape. The cylindrical washing rod body 121 is provided with an opening 121a at the upper end.

The washing rod body 121 may further include a cap 130 provided to cover the opening 121a. The cap 130 may be detachably mounted in the opening 121a of the washing rod body 121. The cap 130 may be provided to remove foreign matter introduced into and deposited in the washing rod body 121.

The cap 130 may further include a hook 141. The hook 141 may be provided to detachably mount the cap 130 to the washing rod body 121. The hook 141 may be formed to extend downward at the lower end of the cap 130. The hook 141 may be formed to extend to be elastically supported at the lower end of the cap 130. The hook 141 may be provided to be elastically supported toward the center of the washing rod body 121. The hook 141 may be elastically supported and coupled from the inside to the outside of the washing rod body 121.

A hook hole 142 is provided in the washing rod body 121 so that the hook 141 is coupled thereto. The hook hole 142 is provided so that the hook 141 can be locked or unlocked. The hook hole 142 is formed on an upper outer circumferential surface of the washing rod body 121. The hook hole 142 may be formed in a size and number corresponding to the hook 141.

The hook 141 may be provided to be disassembled from the hook hole 142 without using a separate tool. At least one surface of the hook 141 coupled to the hook hole 142 may include an inclined surface 141a inclined at an angle of 60 degrees. A curved surface 141b having a curvature may be formed at an outer end of the inclined surface 141a. The inclined surface 141a and the curved surface 141b of the hook 141 can be automatically separated from the hook hole 142 due to the length deformation of the hook 141, so that it can be easily separated by minimizing the frictional force when a certain force is applied. The inclined surface 141a and the curved surface 141b of the hook 141 are provided so that the hook 141 can be easily separated from the hook hole 142.

The first body 111 of the first stirring portion 110 has a shaft coupling boss 115 formed with a shaft rotation preventing groove 116 so that the washing shaft coupling portion 28 of the washing shaft 27 can be fitted.

The shaft coupling boss 115 may be formed on the central rear surface of the first body 111. The shaft coupling boss 115 is formed in a hollow cylindrical shape, and the shaft rotation preventing groove 116 having a plurality of spline grooves 116a is provided on an inner circumferential surface thereof.

A plurality of ribs 117 radially extending around the shaft coupling boss 115 may be provided on the rear surface of the first body 111. A plurality of ribs 117 formed on the first body 111 may be provided to function as an impeller.

The first coupling portion 310 of the first stirring portion 110 includes a coupling groove 311 recessed in the center of the upper surface of the first body 111 and a rotation preventing groove 313 recessed from the coupling groove 311.

The coupling groove 311 of the first coupling portion 310 may be formed in a substantially cylindrical shape. The coupling groove 311 has a circular bottom 312, and its upper surface may be opened so that the second coupling portion 320 can be inserted and coupled thereto.

A plurality of rotation preventing grooves 313 may be formed on the bottom 312 of the first coupling portion 310. The plurality of rotation preventing grooves 313 may be spaced apart from each other in the circumferential direction of the coupling groove 311. Three rotation preventing grooves 313 may be spaced apart from each other on the bottom 312 of the coupling groove 311. Three rotation preventing grooves 313 may be spaced apart from each other on the outside of the bottom 312 of the coupling groove 311. In the embodiment of the present invention, three rotation preventing grooves are shown as an example, but the spirit of the present invention is not limited thereto. For example, the number of rotation preventing grooves may vary according to the size of the first stirring portion and the second stirring portion.

The first coupling portion 310 may further include a guide protrusion 331 formed at the center of the bottom 312 of the coupling groove 311. The guide protrusion 331 of the first coupling portion 310 may be provided to be connected to the shaft coupling boss 115 formed on the rear surface of the coupling groove 311. The guide protrusion 331 may be formed to extend from the shaft coupling boss 115.

The guide protrusion 331 of the first coupling portion 310 may be provided to correspond to a guide hole 332 of the second coupling portion 320 to be described later. The guide protrusion 331 of the first coupling portion 310 may be provided to be inserted into the guide hole 332 of the second coupling portion 320. The guide protrusion 331 may have a size and shape corresponding to the guide hole 332. The guide protrusion 331 and the guide hole 332 may be provided to guide coupling between the first coupling portion 310 and the second coupling portion 320.

The second coupling portion 320 may be provided to correspond to the first coupling portion 310. The second coupling portion 320 includes coupling protrusions 321 formed at the bottom of the first stirring portion 110 to correspond to the coupling grooves 311 and rotation preventing protrusion 322 protruding to the bottom of the coupling protrusions 321 to correspond to the rotation preventing grooves 313.

The coupling protrusion 321 of the second coupling portion 320 may be formed in a substantially cylindrical shape. The coupling protrusion 321 may be formed in a shape and size corresponding to the coupling groove 311. The coupling protrusion 321 may be integrally formed with the washing rod body 121 of the second coupling portion 320. The second coupling portion 320 may be formed to extend below the washing rod body 121.

The coupling protrusion 321 includes a circular bottom surface 321a, and a plurality of rotation preventing protrusions 322 may be formed on the bottom surface 321a. The rotation preventing protrusion 322 may protrude from the bottom surface 321a of the coupling protrusion 321. Three rotation preventing protrusions 322 may be formed spaced apart in a circumferential direction on the bottom surface 321a of the coupling protrusion 321. The rotation preventing protrusion 322 may be formed to correspond to the coupling groove 311 of the first coupling portion 310.

Both side surfaces of the rotation preventing protrusion 322 may include a guide 322a having a predetermined inclination. The guide 322a may be provided to guide the insertion and assembly of the rotation preventing protrusion 322 into the rotation preventing groove 313. Guide 322a may have an angle of approximately 116 degrees. The guide 322a is provided so that when the rotation preventing protrusion 322 is roughly aligned with the rotation preventing groove 313, the guide 322a rides the rotation preventing groove 313 and is positioned at the correct position of the rotation preventing groove 313 to be inserted and coupled.

In the guide 322a, a guide surface 313a corresponding to the guide 322a may be formed in the rotation preventing groove 313.

The rotation preventing protrusion 322 of the second coupling portion 320 is guided to the rotation preventing groove 313 of the first coupling portion 310 by the guide 322a, and if the position of the the second stirring portion 120 is matched to the coupling groove 311 of the first stirring portion 110, it can be positioned in the correct position by riding the guide 322a, then the assembly of the first coupling portion 310 and the second coupling portion 320 can be improved.

The stirring device 100 may further include a reinforcing rib 610 for reinforcing coupling strength between the first coupling portion 310 and the second coupling portion 320.

The reinforcing rib 610 may be provided on at least one of the first coupling portion 310 and the second coupling portion 320. The reinforcing rib 610 may be provided on the coupling protrusion 321 of the second coupling portion 320. The reinforcing rib 610 may protrude in the longitudinal direction on the outer circumferential surface of the coupling protrusion 321. The reinforcing rib 610 may be formed in the coupling direction X of the first coupling portion 310 and the second coupling portion 320. The reinforcing rib 610 may be formed in the longitudinal direction of the second coupling portion 320. The reinforcing rib 610 may be formed in a substantially inverted triangle or inverted trapezoidal shape. The reinforcing rib 610 has an upper side longer than a lower side to facilitate assembly of the coupling protrusion 321 and the coupling groove 311 when the second coupling portion 320 and the first coupling portion 310 are coupled.

A reinforcing rib groove 620 corresponding to the reinforcing rib 610 may be formed in the first coupling portion 310. The reinforcing rib groove 620 may be formed in the coupling groove 311 of the first coupling portion 310. The reinforcing rib groove 620 may be formed in the coupling groove 311 to which the coupling protrusion 321 of the second coupling portion 320 is coupled. The reinforcing rib groove 620 may be formed on the inner circumferential surface of the coupling groove 311. The reinforcing rib groove 620 is formed in a corresponding shape so that the reinforcing rib 610 is coupled thereto. The reinforcing rib groove 620 may be formed such that the reinforcing rib 610 is inserted and coupled thereto. The reinforcing rib groove 620 may have an upper side longer than a lower side so that the reinforcing rib 610 is coupled thereto.

The first stirring portion 110 and the second stirring portion 120 have the safety factor of 2.5 by the configuration of the first coupling portion 310, the second coupling portion 320, the reinforcing rib 610, and the reinforcing rib groove 620, and it is possible to secure the safety factor when considering the maximum torque required for operation.

The stirring device 100 may further include a sealing member 500 provided between the first stirring portion 110 and the second stirring portion 120.

The sealing member 500 may be positioned between the first stirring portion 110 and the second stirring portion 120 to absorb impact between the first stirring portion 110 and the second stirring portion 120. The sealing member 500 may be provided between the first coupling portion 310 and the second coupling portion 320.

The sealing member 500 is positioned between the first stirring portion 110 and the second stirring portion 120 and is provided to reduce the impact caused by the left-right movement caused by the flow generated during operation. The sealing member 500 is provided to reduce bending and impact to the contact portion between the first coupling portion 310 and the second coupling portion 320.

The sealing member 500 may include rubber materials. The sealing member 500 is provided to absorb the impact of friction caused by the flow. The sealing member 500 may be formed in a ring shape.

The sealing member 500 may be provided on the coupling portion 300. The sealing member 500 may be positioned between the first coupling portion 310 and the second coupling portion 320.

The coupling portion 300 of the stirring device 100 includes a support portion 400 provided to support the coupling of the first coupling portion 310 and the second coupling portion 320.

The support portion 400 includes a first support portion 410 provided on the first coupling portion 310 and a second support portion 420 provided on the second coupling portion 320.

The first support portion 410 is provided around the upper end of the coupling groove 311 of the first coupling portion 310. The second support portion 420 is provided on the second coupling portion 320. The second support portion 420 is provided so that at least a portion of the coupling protrusion 321 protrudes in a circumferential direction. The second support portion 420 may be provided on an outer circumferential surface of the coupling protrusion 321. An accommodating portion 421 may be formed inside the second support portion 420 so that the first support portion 410 can be coupled therein. At least a portion of the first support portion 410 may be coupled to and accommodated in the accommodating portion 421 of the second support portion 420. The sealing member 500 may be inserted into the accommodating portion 421 of the second support portion 420.

The sealing member 500 can reduce the impact to prevent to be transmitted to the counterpart by the force due to the rotation between the first support portion 410 and the second support portion 420 and a flow by the gap between the first coupling portion 310 and the second coupling portion 320.

The stirring device 100 having the first stirring portion 110 and the second stirring portion 120, has the assembly property improved through the first coupling portion 310 and the second coupling portion 320, and breakage and component damage can be prevented by means of the sealing member 500 provided between the first coupling portion 310 and the second coupling portion 320.

Although a few embodiments of the disclosure have been shown and described, it would be appreciated by those skilled in the art that changes may be made in these embodiments without departing from the principles and spirit of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A washing machine comprising:
   a tub;
   a rotating tub rotatably provided in the tub; and
   a stirring device including a first stirring portion rotatably provided in a lower portion of the rotating tub and a second stirring portion coupled to the first stirring portion;
   the second stirring portion includes:
      a washing rod body having a cylindrical shape;
      a groove recessed from an outer surface of the washing rod body and extending in a longitudinal direction; and
      a parting line formed by a manufacturing process of the second stirring portion, the parting line positioned within the groove.

2. The washing machine of claim 1, wherein the groove is formed to be recessed from the outer surface of the washing rod body.

3. The washing machine of claim 1, wherein the groove is formed to be concave 0.3 mm inward from the outer surface of the washing rod body.

4. The washing machine of claim 1, wherein a width of the groove is formed to be 1.0 mm or less.

5. The washing machine of claim 1, wherein:
the stirring device includes a coupling portion configured to detachably connect the first stirring portion and the second stirring portion,
wherein the coupling portion includes:
a first coupling portion provided in the first stirring portion, and
a second coupling portion provided in the second stirring portion to correspond to the first coupling portion.

6. The washing machine of claim 5, wherein the stirring device includes a sealing member configured to absorb an impact between the first stirring portion and the second stirring portion.

7. The washing machine of claim 6, wherein the sealing member is mounted on the second stirring portion.

8. The washing machine of claim 6, wherein the first coupling portion includes:
a coupling groove formed to be recessed on an upper surface of the first stirring portion, and
a plurality of rotation preventing grooves formed to be recessed downward from the coupling groove.

9. The washing machine of claim 8, wherein the second coupling portion includes:
a coupling protrusion formed at a lower part of the second stirring portion to correspond to the coupling groove, and
a plurality of rotation preventing protrusions protruding downward from the coupling protrusion and corresponding to the plurality of rotation preventing grooves.

10. The washing machine of claim 9, wherein the rotation preventing protrusion further includes a guide formed to be inclined to guide coupling to the coupling groove.

11. The washing machine of claim 9, wherein:
the coupling portion further includes a reinforcing rib configured to reinforce strength between the first stirring portion and the second stirring portion, and
the reinforcing rib is formed on at least one of the first coupling portion or the second coupling portion.

12. The washing machine of claim 8, wherein:
the coupling portion further includes a support portion configured to support the coupling of the first coupling portion and the second coupling portion, and the support portion includes:
a first support portion formed around an upper end of the coupling groove, and
a second support portion extending on an outer circumferential surface of the coupling portion to correspond to the first support portion.

13. The washing machine of claim 12, wherein the sealing member is provided between the first support portion and the second support portion.

14. The washing machine of claim 1, wherein:
the second stirring portion further includes:
a cap detachably mounted to the washing rod body,
the cap extends to be detachably mounted to the washing rod body and further includes a hook capable of being elastically supported, and
a hook hole is formed on the washing rod body to lock and unlock the hook.

15. A washing machine comprises:
a rotating tub configured to accommodate laundry,
a pulsator rotatably provided under the rotating tub, and
an agitator perpendicularly coupled to the pulsator and configured to rub the laundry and water, wherein the agitator includes:
a cylindrical shaped agitator body and a spiral shape agitator blade extending from an outer circumferential surface of the agitator body,
a groove formed to be recessed on an outer circumferential surface of the agitator body and extending in a longitudinal direction, and
a parting line formed during a manufacturing process of the agitator, the parting line positioned in the groove.

16. The washing machine of claim 15, wherein the groove is formed to be concave 0.3 mm inward from the outer surface of the agitator body, and has a width of 1.0 mm or less.

17. The washing machine of claim 15, wherein:
the pulsator includes a first coupling portion, and
the agitator includes a second coupling portion configured to detachably connect to the first coupling portion.

18. The washing machine of claim 17, further comprising:
a sealing member configured to absorb impact between the pulsator and the agitator.

19. The washing machine of claim 18, wherein:
the first coupling portion includes a first support portion formed around an upper end of the first coupling portion, and
the second coupling portion includes a second support portion extending from an outer circumferential surface of the second coupling portion to correspond to the first support portion.

20. The washing machine of claim 19, wherein the sealing member is provided between the first support portion and the second support portion.

* * * * *